(12) United States Patent
Lam et al.

(10) Patent No.: US 8,482,269 B2
(45) Date of Patent: Jul. 9, 2013

(54) SUPPLY VOLTAGE CONTROL BASED AT LEAST IN PART ON POWER STATE OF INTEGRATED CIRCUIT

(75) Inventors: Son H. Lam, Puyallup, WA (US); Joseph T. Dibene, II, Olympia, WA (US); Henry W. Koertzen, Olympia, WA (US); Steven D. Patzer, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/299,331

(22) Filed: Nov. 17, 2011

(65) Prior Publication Data

US 2012/0299621 A1 Nov. 29, 2012

Related U.S. Application Data

(62) Division of application No. 11/967,845, filed on Dec. 31, 2007, now Pat. No. 8,063,618.

(51) Int. Cl.
*G05F 1/40* (2006.01)

(52) U.S. Cl.
USPC .......................................................... 323/283

(58) Field of Classification Search
USPC ................... 323/282, 283, 285; 363/144, 147
See application file for complete search history.

(56) References Cited

U.S. PATENT DOCUMENTS

| | | | |
|---|---|---|---|
| 5,705,920 A | 1/1998 | Watanabe et al. | |
| 5,926,394 A | 7/1999 | Nguyen et al. | |
| 5,945,817 A | 8/1999 | Nguyen | |
| 6,141,583 A | 10/2000 | Pape et al. | |
| 6,392,362 B1 | 5/2002 | Ito | |
| 6,639,391 B2 | 10/2003 | Huang et al. | |
| 6,664,774 B2 | 12/2003 | Lethellier | |
| 6,690,590 B2 | 2/2004 | Stamenic et al. | |
| 6,693,412 B2 | 2/2004 | Ruan et al. | |
| 6,784,647 B2 | 8/2004 | Nguyen et al. | |

(Continued)

FOREIGN PATENT DOCUMENTS

TW 200622572 7/2006

OTHER PUBLICATIONS

Voltage Regulator-Down (VRD) 11.0 Processor Power Delivery Design Guidelines—For Desktop LGA775 Socket, Document No. 313214-002, pp. 1-88 (Nov. 2006).

(Continued)

*Primary Examiner* — Matthew Nguyen
(74) *Attorney, Agent, or Firm* — Blakely, Sokoloff, Taylor & Zafman LLP

(57) ABSTRACT

Disclosed is a switching voltage regulator circuitry controlled to supply a voltage to at least a portion of an integrated circuit (IC). Information corresponding to a current load for a different power state of at least a portion of the IC is received. The switching voltage regulator circuitry is controlled to adjust the voltage to a different value based at least in part on the received information. Disclosed is a voltage received for a power state of at least a portion of an IC having first logic to perform one or more functions and second logic integrated with the first logic. Information corresponding to a current load for a different power state of at least a portion of the IC is sent from the second logic to voltage regulator control logic to adjust the voltage to a different value.

12 Claims, 7 Drawing Sheets

U.S. PATENT DOCUMENTS

| | | | |
|---|---|---|---|
| 6,816,978 B1 | 11/2004 | Kaminski et al. | |
| 6,839,854 B2 | 1/2005 | Nguyen | |
| 6,906,433 B2 | 6/2005 | Nguyen | |
| 6,933,711 B2 | 8/2005 | Sutardja et al. | |
| 6,940,163 B2 | 9/2005 | Piorun et al. | |
| 7,044,571 B2 | 5/2006 | Smith et al. | |
| 7,049,802 B2 | 5/2006 | Ruan et al. | |
| 7,119,398 B1 | 10/2006 | Bakker | |
| 7,170,811 B1 | 1/2007 | Allen | |
| 7,239,531 B2 | 7/2007 | Oh | |
| 7,242,172 B2 | 7/2007 | Carlson et al. | |
| 7,368,897 B2 | 5/2008 | Qahouq et al. | |
| 7,421,593 B2 | 9/2008 | Koertzen | |
| 7,484,108 B2 | 1/2009 | Diefenbaugh et al. | |
| 7,519,839 B2 | 4/2009 | Diefenbaugh et al. | |
| 7,523,337 B2 | 4/2009 | Borkar et al. | |
| 7,541,693 B2 | 6/2009 | Huang et al. | |
| 7,624,291 B2 | 11/2009 | Nguyen | |
| 7,636,864 B2 | 12/2009 | Burton | |
| 7,649,345 B2 | 1/2010 | Kwan | |
| 7,667,447 B2 | 2/2010 | Huang et al. | |
| 7,685,441 B2 | 3/2010 | Burton et al. | |
| RE41,270 E * | 4/2010 | Hiraki et al. | 323/268 |
| 7,745,559 B2 * | 6/2010 | Kobayashi | 527/403 |
| 7,804,733 B2 | 9/2010 | Alexander et al. | |
| 7,821,246 B2 | 10/2010 | Koertzen et al. | |
| 7,898,230 B2 * | 3/2011 | Lee et al. | 323/273 |
| 7,908,496 B2 | 3/2011 | Rodriguez et al. | |
| 7,932,639 B2 | 4/2011 | Ma et al. | |
| 8,063,618 B2 | 11/2011 | Lam et al. | |
| 2004/0093533 A1 | 5/2004 | Chapuis et al. | |
| 2005/0149770 A1 | 7/2005 | Koertzen et al. | |
| 2005/0180181 A1 | 8/2005 | Gaudreau et al. | |
| 2005/0283625 A1 | 12/2005 | Rotem et al. | |
| 2005/0285584 A1 | 12/2005 | Kwan | |
| 2005/0289373 A1 | 12/2005 | Chapuis et al. | |
| 2006/0015616 A1 | 1/2006 | Chapuis et al. | |
| 2006/0161792 A1 | 7/2006 | Paul et al. | |
| 2006/0255777 A1 | 11/2006 | Koertzen | |
| 2007/0013080 A1 | 1/2007 | DiBene et al. | |
| 2007/0260898 A1 | 11/2007 | Burton et al. | |
| 2008/0082839 A1 | 4/2008 | DiBene et al. | |
| 2008/0106248 A1 | 5/2008 | Qahouq et al. | |
| 2008/0116589 A1 | 5/2008 | Li et al. | |
| 2008/0201586 A1 | 8/2008 | Onishi et al. | |
| 2009/0153109 A1 | 6/2009 | Koertzen et al. | |
| 2009/0249092 A1 | 10/2009 | Lam et al. | |
| 2010/0153756 A1 | 6/2010 | Huang et al. | |

OTHER PUBLICATIONS

Voltage Regulator Module (VRM) and Enterprise Voltage Regulator-Down (EVRD) 11.0 Design Guidelines, Document No. 315889, Revision 001, pp. 1-54 (Nov. 2006).

Non-Final Office Action mailed Aug. 10, 2010 for U.S. Appl. No. 11/967,845.

Notice of Allowance mailed Mar. 21, 2011 for U.S. Appl. No. 11/967,845.

Notice of Allowance mailed Jul. 13, 2011 for U.S. Appl. No. 11/967,845.

Non-Final Office Action mailed Jan. 2, 2012 for German Patent Application No. 10 2008 064 368.8.

Official Letter mailed Jul. 26, 2012 for Taiwan Patent Application No. 97148743.

Notice of Grant mailed Nov. 14, 2012 for German Patent Application No. 10 2008 064 368.8.

* cited by examiner

SUPPLY VOLTAGE CONTROL BASED AT LEAST IN PART ON POWER STATE OF INTEGRATED CIRCUIT

CROSS-REFERENCE TO RELATED APPLICATION

This patent application is a Divisional application and claims priority to U.S. patent application Ser. No. 11/967,845, filed on Dec. 31, 2007, entitled "SUPPLY VOLTAGE CONTROL BASED AT LEAST IN PART ON POWER STATE OF INTEGRATED CIRCUIT, " and issued as U.S. Pat. No. 8,063,618 on Nov. 22, 2011. This earlier application is incorporated herein by reference in its entirety.

FIELD

Embodiments described herein generally relate to power delivery.

BRIEF DESCRIPTION OF THE DRAWINGS

Embodiments are illustrated by way of example and not limitation in the figures of the accompanying drawings, in which like references indicate similar elements and in which.

The figures of the drawings are not necessarily drawn to scale.

DETAILED DESCRIPTION

The following detailed description sets forth example embodiments of apparatuses, methods, and systems relating to supply voltage control based at least in part on power state of an integrated circuit. Features, such as structure(s), function(s), and/or characteristic(s) for example, are described with reference to one embodiment as a matter of convenience; various embodiments may be implemented with any suitable one or more described features.

Figure 1:
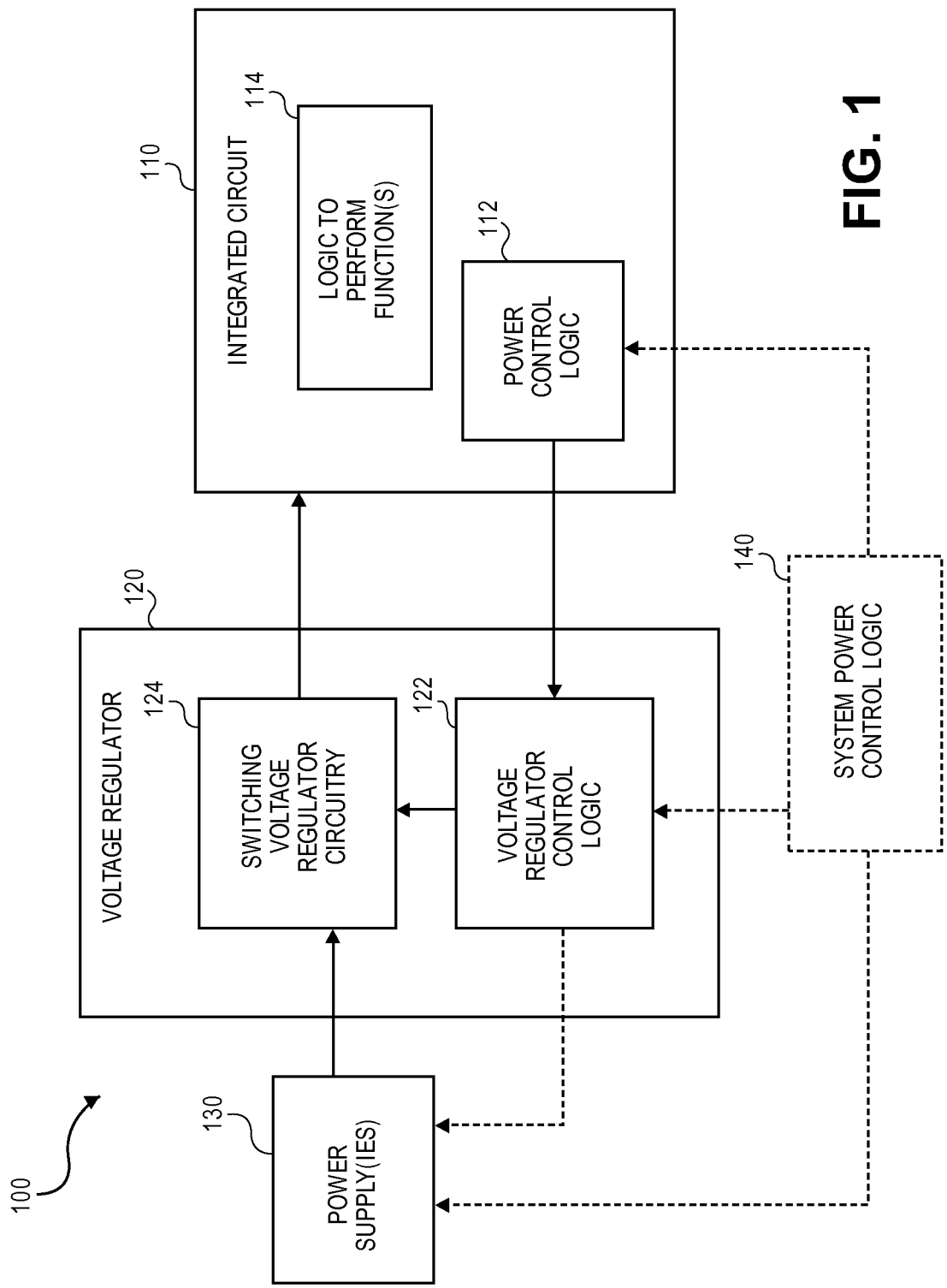
FIG. 1 illustrates, for one embodiment, a block diagram of a system having voltage regulator control logic to control supply voltage for at least a portion of an integrated circuit based at least in part on a power state of the integrated circuit.

FIG. 1 illustrates, for one embodiment, a system 100 comprising an integrated circuit 110, a voltage regulator (VR) 120, and one or more power supplies 130. One or more power supplies 130 may be coupled to supply power to VR 120, and VR 120 may be coupled to supply power to at least a portion of integrated circuit 110. VR 120 may be coupled to supply one or more regulated voltages to at least a portion of integrated circuit 110.

Power supply(ies) 130 may be implemented in any suitable manner. Power supply(ies) 130 for one embodiment may include one or more suitable energy cells, such as a battery or fuel cell for example. Power supply(ies) 130 for one embodiment may include an alternating current to direct current (AC-DC) converter. Power supply(ies) 130 for one embodiment may optionally include one or more voltage regulators to regulate supply of power to VR 120.

VR 120 for one embodiment, as illustrated in FIG. 1, may comprise voltage regulator (VR) control logic 122 coupled to receive information corresponding to a current load for a different power state of at least a portion of integrated circuit 110 to adjust one or more voltages supplied to at least a portion of integrated circuit 110 to a different value based at least in part on the received information. By receiving information corresponding to a current load for at least a portion of integrated circuit 110, VR control logic 122 for one embodiment may control VR 120 to help supply power with improved efficiency and therefore help reduce power consumption. VR control logic 122 for one embodiment may control VR 120 to help supply power with improved efficiency as compared, for example, to merely adjusting a voltage supplied to at least a portion of integrated circuit 110 to a value identified by a received voltage identification (VID) code which does not identify a current load for at least a portion of integrated circuit 110.

VR 120 for one embodiment, as illustrated in FIG. 1, may comprise switching voltage regulator (VR) circuitry 124 coupled to receive power from one or more power supplies 130 to supply one or more voltages to at least a portion of integrated circuit 110. VR control logic 122 for one embodiment may be coupled to control switching VR circuitry 124 to adjust one or more voltages supplied to at least a portion of integrated circuit 110 to a different value based at least in part on the received information.

VR control logic 122 may be coupled to receive information corresponding to a current load for a different power state of at least a portion of integrated circuit 110 from any suitable source.

Integrated circuit 110 for one embodiment, as illustrated in FIG. 1, may have power control logic 112 coupled to send such information to VR control logic 122. Power control logic 112 for one embodiment may identify whether a portion or all of integrated circuit 110 is about to enter, is entering, and/or has entered a different power state and may send to VR control logic 122 any suitable information relating to such entry to a different power state. Power control logic 112 may be implemented using any suitable logic, including any suitable hardware, firmware, and/or software. Power control logic 112 for one embodiment, as illustrated in FIG. 1, may be integrated on integrated circuit 110. Power control logic 112 for another embodiment may be external yet coupled to integrated circuit 110.

For one embodiment, system 100 may also comprise system power control logic 140 coupled to control one or more power supplies 130 and/or one or more voltage regulators, including VR 120, to supply power to multiple components including integrated circuit 110. System power control logic 140 for one embodiment may be coupled to power control logic 112 for integrated circuit 110 to identify whether a portion or all of integrated circuit 110 is about to enter, is entering, and/or has entered a different power state and may send to VR control logic 122 any suitable information relating to such entry to a different power state. System power control logic 140 for one embodiment may be coupled to place a portion or all of integrated circuit 110 in a different power state and may send to VR control logic 122 any suitable information relating to such placement in a different power state. System power control logic 140 may be implemented using any suitable logic, including any suitable hardware, firmware, and/or software.

System power control logic 140 for one embodiment may be coupled to control supply of power to multiple components supported by a board. System power control logic 140 for one embodiment may comprise a Baseboard Management Controller (BMC).

For one embodiment where at least a portion of integrated circuit 110 is to reside in a different power state for at least a predetermined amount of time, VR control logic 122 for one embodiment may be adapted to receive, for example from integrated circuit 110 or system power control logic 140, information corresponding to that amount of time. VR control logic 122 for one embodiment may then adjust one or more voltages supplied to at least a portion of integrated circuit 110 to a different value for a duration based at least in part on the received information corresponding to that amount of time.

After expiration of such a duration, VR control logic 122 for one embodiment may again adjust one or more voltages supplied to at least a portion of integrated circuit 110. VR control logic 122 for one embodiment may return one or more voltages to a prior value, such as a just prior value for example. VR control logic 122 for one embodiment may automatically adjust one or more voltages supplied to at least a portion of integrated circuit 110 to a predetermined value in response to expiration of such a duration. VR control logic 122 for one embodiment may automatically adjust one or more voltages to help reduce or avoid performance impact by resume latency.

VR control logic 122 for one embodiment may be adapted to receive a command having information corresponding to a current load for a different power state of at least a portion of integrated circuit 110. The command may instruct VR control logic 122 to adjust one or more voltages supplied to at least a portion of integrated circuit 110 to a different value based at least in part on the received information.

VR control logic 122 for one embodiment may be adapted to receive information that identifies a different power state of at least a portion of integrated circuit 110. VR control logic 122 for one embodiment may identify a current load based at least in part on the identified power state to adjust one or more voltages supplied to at least a portion of integrated circuit 110 to a different value based at least in part on the identified current load.

Integrated Voltage Regulator

VR control logic 122 and at least a portion of switching VR circuitry 124 for one embodiment may be integrated on the same die. Such a die for one embodiment may be separate from yet coupled in any suitable manner to a die having integrated circuit 110.

Figure 2:
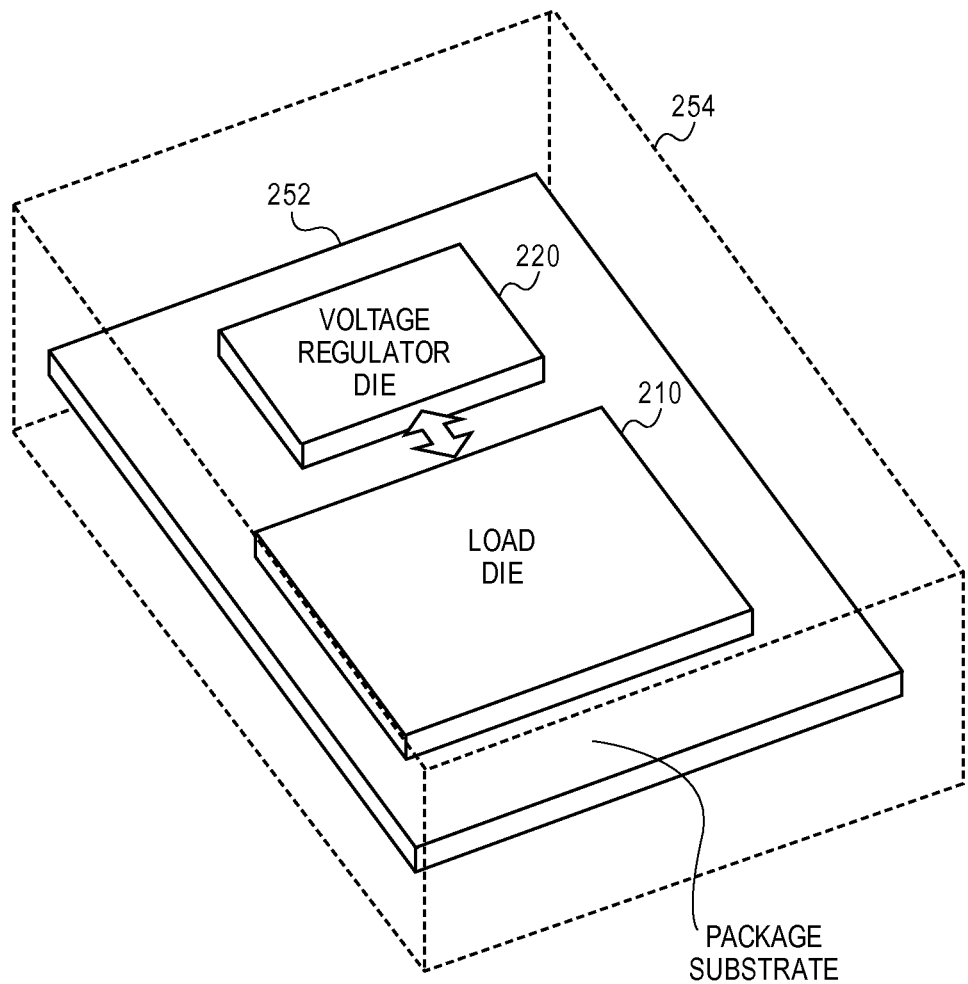
FIG. 2 illustrates, for one embodiment, a die having an integrated circuit and a die having at least voltage regulator control logic to control supply voltage for at least a portion of the integrated circuit based at least in part on a power state of the integrated circuit.

FIG. 2 illustrates, for one embodiment, a voltage regulator (VR) die 220 and a load die 210 positioned side-by-side in a substantially coplanar manner. VR die 220 for one embodiment may have VR control logic 122 and at least a portion of switching VR circuitry 124, and load die 210 for one embodiment may have integrated circuit 110. VR die 220 may be coupled to load die 210 in any suitable manner. VR die 220 and load die 210 for one embodiment may be packaged together in the same package in any suitable manner to form a multichip module (MCM). VR die 220 and load die 210 for one embodiment, as illustrated in FIG. 2, may be supported by a common package substrate 252 and encapsulated in an encapsulant 254 of any suitable material.

VR die 220 and load die 210 for another embodiment may be positioned in a stacked manner and packaged together in the same package.

Co-locating VR die 220 with load die 210 in the same package for one embodiment may help allow VR die 220 and/or load die 210 to manage power delivery to load die 210 in a relatively efficient manner.

VR die 220 for one embodiment may have all of switching VR circuitry 124. For another embodiment, a portion of switching VR circuitry 124 may optionally reside in the same package yet external to VR die 220 and load die 210. Such a portion for one embodiment may include, for example and without limitation, one or more capacitors, one or more inductors, and/or one or more power transistors. Such a portion for one embodiment may be supported by package substrate 252.

Voltage Adjustment Based at Least in Part on Power State

VR control logic 122 may adjust one or more voltages supplied to at least a portion of integrated circuit 110 to a different value in any suitable manner based at least in part on received information corresponding to a current load for a different power state of at least a portion of integrated circuit 110.

VR control logic 122 for one embodiment may adjust a loadline based at least in part on such received information to at least help adjust a voltage supplied to at least a portion of integrated circuit 110. The loadline corresponds to an output impedance of VR 120 and specifies droop voltage for currents between a minimum and maximum load. VR control logic 122 for one embodiment may reduce output impedance of VR 120 to help save power. VR control logic 122 for one embodiment may reduce output impedance of VR 120 when VR control logic 122 receives information that at least a portion of integrated circuit 110 is to be in one of one or more particular power states for at least some amount of time.

VR control logic 122 for one embodiment may apply or adjust a voltage offset based at least in part on such received information to at least help adjust a voltage supplied to at least a portion of integrated circuit 110. VR control logic 122 for one embodiment may identify a voltage offset value based at least in part on such received information.

VR control logic 122 for one embodiment may reduce a voltage supplied to at least a portion of integrated circuit 110 to below a voltage or voltage range corresponding to the different power state based at least in part on received information. VR control logic 122 for one embodiment may associate a voltage or voltage range with the different power state for a given load. VR control logic 122 for one embodiment may reduce the voltage supplied to at least a portion of integrated circuit 110 to below that associated voltage or voltage range to help save power. VR control logic 122 for one embodiment may reduce the voltage supplied to at least a portion of integrated circuit 110 to below that associated voltage or voltage range when VR control logic 122 receives information that at least a portion of integrated circuit 110 is to transition to the different power state which is a lower power state.

VR control logic 122 for one embodiment, as illustrated in FIG. 1, may adjust one or more input voltages for VR 120 from one or more power supplies 130 based at least in part on received information to at least help adjust one or more voltages supplied to at least a portion of integrated circuit 110. VR control logic 122 for one embodiment may adjust one or more input voltages for switching VR circuitry 124. VR control logic 122 for one embodiment, as illustrated in FIG. 1, may be coupled to control one or more voltage regulators of power supply(ies) 130 to adjust one or more input voltages for VR 120.

Figure 3:
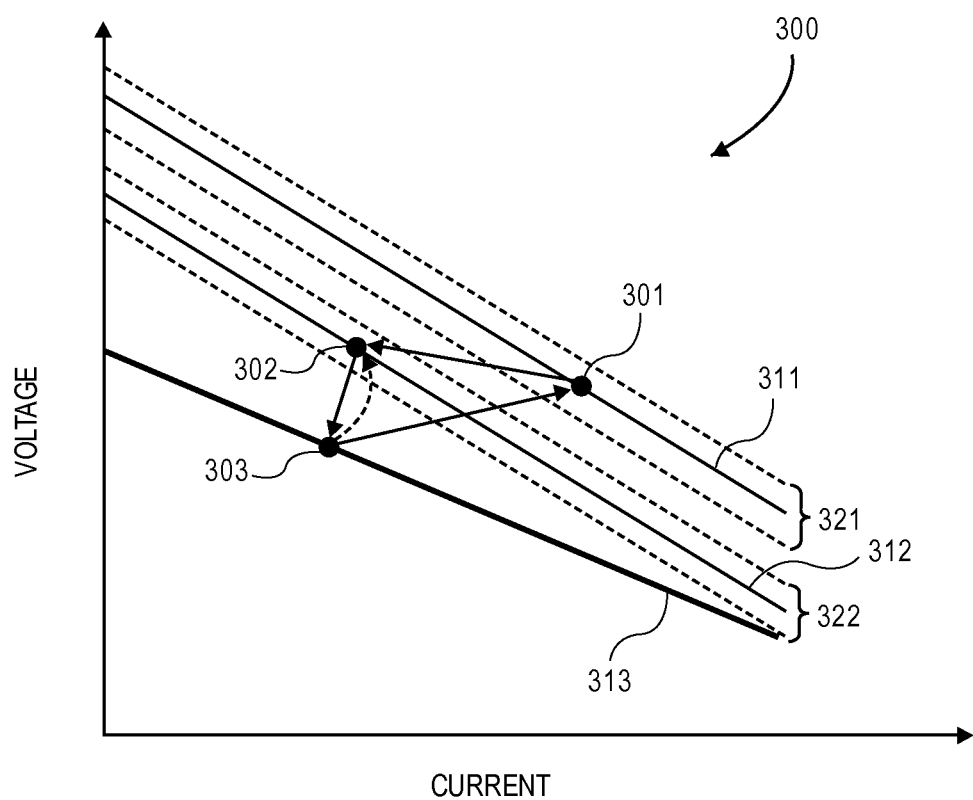
FIG. 3 illustrates, for one embodiment, a graph showing example voltage and load current transitions for at least a portion of an integrated circuit.

FIG. 3 illustrates, for one embodiment, a graph 300 showing example voltage and load current transitions for at least a portion of integrated circuit 110.

Location 301 on graph 300 corresponds to a voltage and load current for at least a portion of integrated circuit 110 when in a first power state. VR control logic 122 for one embodiment, as illustrated in FIG. 3, may help control supply of the voltage to at least a portion of integrated circuit 110 in accordance with a loadline 311 having a voltage tolerance band 321 in which VR control logic 122 helps maintain the voltage to help supply sufficient power over temperature and process ranges. VR control logic 122 for one embodiment may receive, for example from integrated circuit 110 or system power control logic 140, information corresponding to a voltage identification (VID) to help control supply of the voltage in accordance with loadline 311.

Location 302 on graph 300 corresponds to a voltage and load current for at least a portion of integrated circuit 110 when in a different, second power state. VR control logic 122 for one embodiment, as illustrated in FIG. 3, may help control supply of the voltage to at least a portion of integrated circuit 110 in accordance with a different, second loadline 312 having a voltage tolerance band 322 in which VR control logic 122 helps maintain the voltage to help supply sufficient power over temperature and process ranges. VR control logic 122 for one embodiment may receive, for example from integrated circuit 110 or system power control logic 140, information corresponding to a voltage identification (VID) to help control supply of the voltage in accordance with loadline 312.

VR control logic 122 may receive, for example from integrated circuit 110 or system power control logic 140, information corresponding to a current load for the second power state when at least a portion of integrated circuit 110 is about to transition or does transition from the first power state to the second power state.

Location 303 on graph 300 corresponds to a voltage and load current for at least a portion of integrated circuit 110 following adjustment of the voltage supplied to at least a portion of integrated circuit 110 based at least in part on the received information corresponding to a current load for the second power state. Location 303 for one embodiment, as illustrated in FIG. 3, corresponds to a reduced voltage supplied to at least a portion of integrated circuit 110 relative to the voltage corresponding to location 302.

For one embodiment where VR control logic 122 may receive information corresponding to a voltage identification (VID), VR control logic 122 for one embodiment may receive information corresponding to a current load for a different power state separate from any information corresponding to a VID. VR control logic 122 for one embodiment may receive a single command having information corresponding to a VID and having separate information corresponding to a current load for a different power state. Referring to the example of FIG. 3 when at least a portion of integrated circuit 110 is about to transition or does transition from the first power state to the second power state, VR control logic 122 may receive a command having information corresponding to a new VID to transition from location 301 to location 302 and having separate information corresponding to a current load for the second power state to transition from location 302 to location 303. VR control logic 122 for another embodiment may receive a command having information corresponding to a current load for a different power state separate from any command having information corresponding to a VID.

VR control logic 122 for one embodiment, as illustrated in FIG. 3, may adjust loadline 312 to a loadline 313 based at least in part on the received information corresponding to a current load for the second power state to at least help adjust the voltage supplied to at least a portion of integrated circuit 110 to the voltage corresponding to location 303. VR control logic 122 for one embodiment may apply or adjust a voltage offset based at least in part on the received information corresponding to a current load for the second power state to at least help adjust the voltage supplied to at least a portion of integrated circuit 110 to the voltage corresponding to location 303. VR control logic 122 for one embodiment may adjust an input voltage for VR 120 from one or more power supplies 130 based at least in part on the received information based at least in part on the received information corresponding to a current load for the second power state to at least help adjust the voltage supplied to at least a portion of integrated circuit 110 to the voltage corresponding to location 303.

For one embodiment where at least a portion of integrated circuit 110 is to reside in the second power state for at least a predetermined amount of time, VR control logic 122 for one embodiment may be adapted to receive, for example from integrated circuit 110 or system power control logic 140, information corresponding to that amount of time. VR control logic 122 for one embodiment may then adjust the voltage supplied to at least a portion of integrated circuit 110 to the voltage corresponding to location 303 for a duration based at least in part on the received information corresponding to that amount of time.

After expiration of that duration, VR control logic 122 for one embodiment may then return the voltage supplied to at least a portion of integrated circuit 110 to a voltage corresponding to the first power state, such as the voltage corresponding to location 301 for example. VR control logic 122 for one embodiment may alternatively return the voltage supplied to at least a portion of integrated circuit 110 to a voltage corresponding to the second power state, such as the voltage corresponding to location 302 for example. VR control logic 122 for one embodiment may automatically return to the voltage corresponding to the first or second power state in response to expiration of that duration.

Load Integrated Circuit

As illustrated in FIG. 1, integrated circuit 110 for one embodiment may have any suitable logic 114, including any suitable hardware, firmware, and/or software, to perform any suitable one or more functions. Logic 114 for one embodiment may include one or more cores to perform instructions. Logic 114 for one embodiment may be integrated with power control logic 112 in integrated circuit 110.

Power control logic 112 for one embodiment may identify whether a portion or all of integrated circuit 110 is about to enter, is entering, and/or has entered a different power state. Power control logic 112 for one embodiment may monitor any suitable one or more conditions to identify whether a portion or all of integrated circuit 110 is about to enter, is entering, and/or has entered a different power state. Power control logic 112 for one embodiment may monitor any suitable one or more conditions in any suitable manner and may place a portion or all of integrated circuit 110 in a different power state in any suitable manner based at least in part on one or more monitored conditions.

For one embodiment where integrated circuit 110 may have logic 114 that includes one or more cores to perform instructions, at least a portion of integrated circuit 110 may be placed in an operation mode or state that corresponds to a power state. Example operation modes may include, without limitation, a normal or operating mode, an idle mode, a deep-idle mode, a standby mode, a sleep mode, a deep-sleep mode, and/or a non-powered mode.

At least a portion of integrated circuit 110 for one embodiment may be placed in a power state for a predetermined amount of time. As one example, without limitation, power control logic 112 for one embodiment may statistically predict a traffic pattern of a workload for logic 114 and may then identify an amount of time at least a portion of logic 114 should be in a particular power state based at least in part on the traffic pattern. Power control logic 112 for one embodiment may send information corresponding to the amount of time to VR control logic 122 in any suitable manner.

Figure 4:
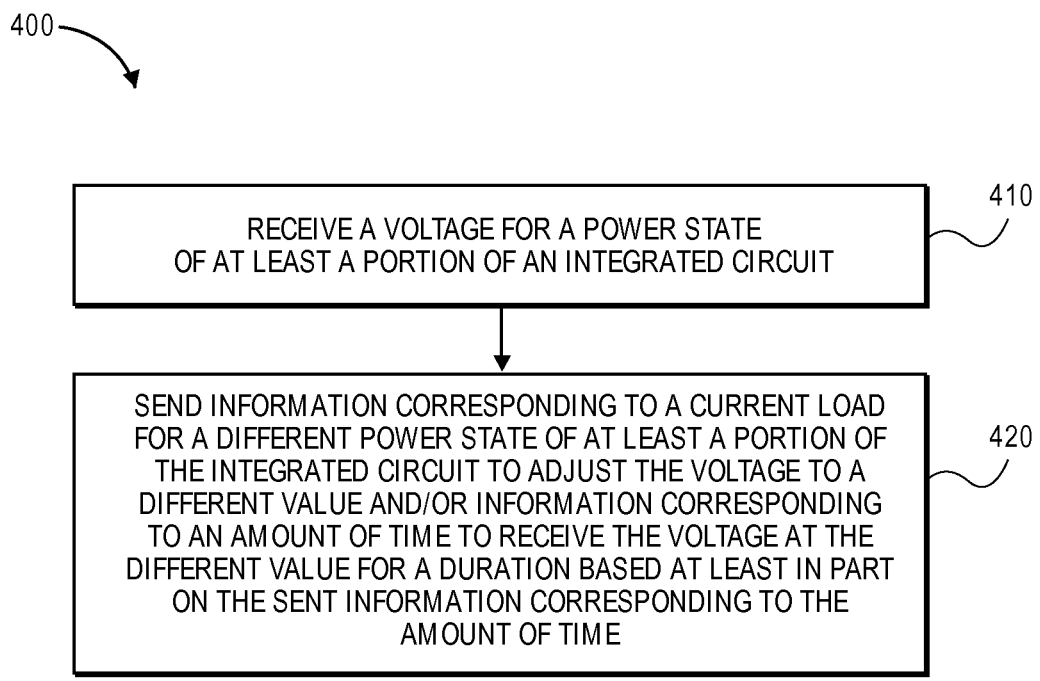
FIG. 4 illustrates, for one embodiment, a flow diagram to control supply voltage for at least a portion of an integrated circuit based at least in part on a power state of the integrated circuit.

FIG. 4 illustrates, for one embodiment, a flow diagram 400 for one embodiment where power control logic 112 may be used to help control VR 120. For block 410 of FIG. 4, integrated circuit 110 may receive a voltage for a power state of at least a portion of integrated circuit 110. For block 420, power control logic 112 may send to VR control logic 122 information corresponding to a current load for a different power state of at least a portion of integrated circuit 110 to adjust the voltage to a different value. For one embodiment where at least a portion of integrated circuit 110 is to reside in the different power state for at least an amount of time, power control logic 112 for one embodiment for block 410 may send to VR control logic 122 information corresponding to the amount of time to receive the voltage at the different value for a duration based at least in part on the sent information corresponding to the amount of time.

VR Control Logic and Switching VR Circuitry

Figure 5:
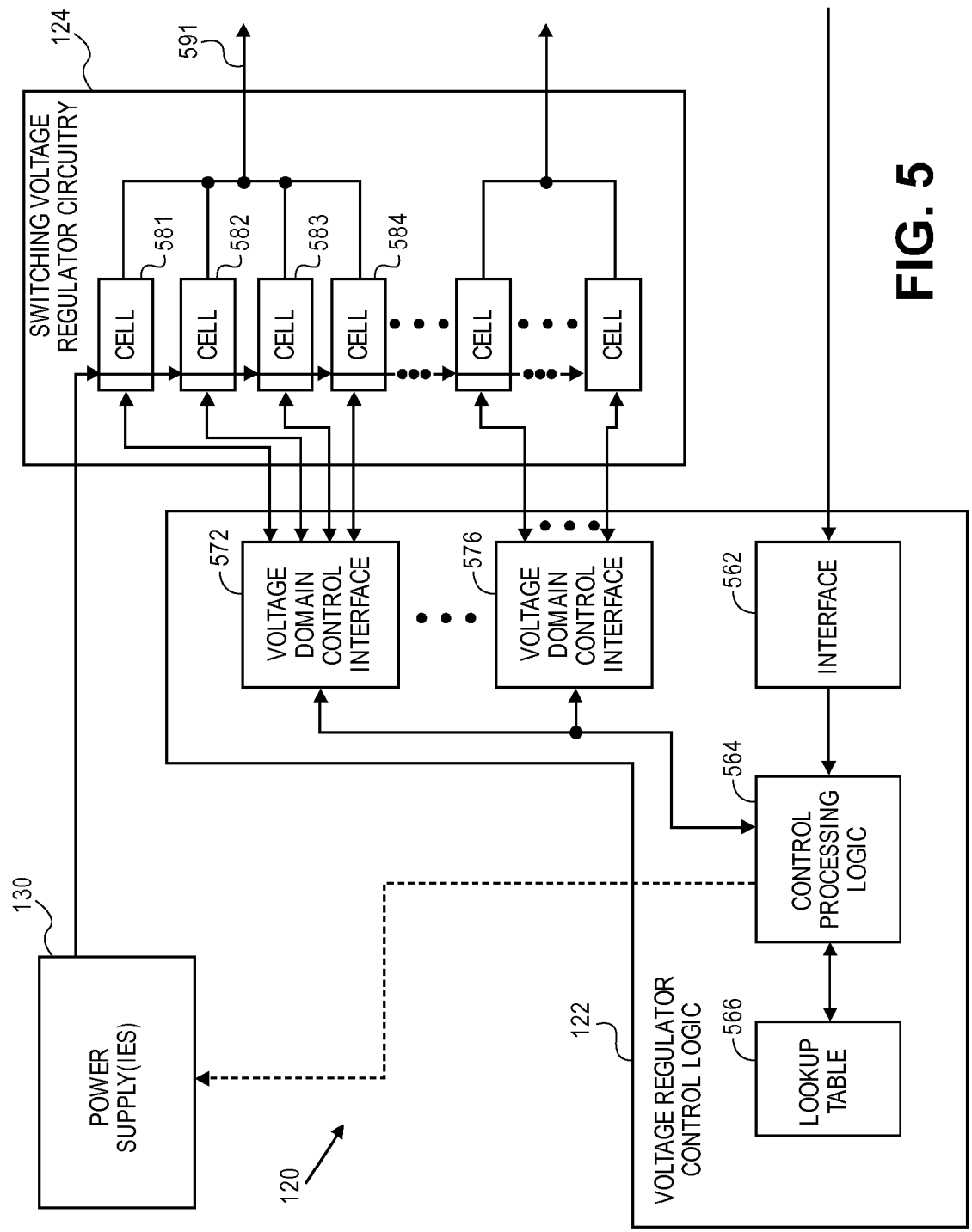
FIG. 5 illustrates, for one embodiment, a block diagram of voltage regulator control logic and switching voltage regulator circuitry.

VR control logic 122 may be implemented using any suitable logic, including any suitable hardware, firmware, and/or software. VR control logic 122 for one embodiment, as illustrated in FIG. 5, may have any suitable logic to implement at least an interface 562 and a control processing logic 564.

Interface 562 for one embodiment may be coupled to receive, for example from integrated circuit 110 or system power control logic 140, one or more commands to control one or more voltages supplied to at least a portion of integrated circuit 110. Control processing logic 564 may be coupled to receive a command from interface 562 and decode and perform the received command.

Control processing logic 564 for one embodiment may decode and perform a command having information corresponding to a current load for a different power state of at least a portion of integrated circuit 110 to adjust one or more voltages supplied to at least a portion of integrated circuit 110 to a different value based at least in part on such information. Such information for one embodiment may identify the different power state of at least a portion of integrated circuit 110, and control processing logic 564 for one embodiment may reference a lookup table (LUT) 566 based at least in part on the identified power state to identify a corresponding current load for the different power state. Control processing logic 564 for one embodiment may adjust one or more voltages supplied to at least a portion of integrated circuit 110 to a different value based at least in part on the identified current load. VR control logic 122 may have any suitable logic to implement LUT 566 to store a current load for different power states.

Control processing logic 564 for one embodiment may decode and perform a command having information corresponding to a voltage identification (VID) to adjust one or more voltages supplied to at least a portion of integrated circuit 110 based at least in part on such information. Control processing logic 564 for one embodiment may decode and perform a command having both information corresponding to a VID and information corresponding to a current load for a different power state of at least a portion of integrated circuit 110.

Interface 562 for one embodiment may be coupled to receive, for example from integrated circuit 110 or system power control logic 140, information corresponding to a VID over one or more separate, dedicated lines for control processing logic 564 to adjust one or more voltages supplied to at least a portion of integrated circuit 110 based at least in part on such information.

VR control logic 122 may be coupled to control switching VR circuitry 124 in any suitable manner to control one or more voltages supplied to at least a portion of integrated circuit 110. For one embodiment, control processing logic 564 may be coupled to control switching VR circuitry 124 through a control interface for one or more voltage domains, such as voltage domain control interfaces 572 and 576 for example, to control a corresponding voltage supplied to at least a portion of integrated circuit 110. VR control logic 122 may have any suitable logic to implement one or more voltage domain control interfaces.

Switching VR circuitry 124 may be implemented using any suitable circuitry. Switching VR circuitry 124 for one embodiment may have any suitable circuitry to implement one or more switching VR cells coupled to receive power from one or more power supplies 130 to supply one or more voltages to at least a portion of integrated circuit 110. A switching VR cell for one embodiment may correspond to a stand-alone voltage regulator having its own power train and control loop. One or more switching VR cells for one embodiment may be coupled to supply voltage for a corresponding voltage domain. As one example, as illustrated in FIG. 5, switching VR cells 581, 582, 583, and 584 may be coupled to supply a voltage 591.

Control processing logic 564 may be coupled to control supply of a voltage for one or more corresponding voltage domains through one or more corresponding control interfaces in any suitable manner. Control processing logic 564 for one embodiment may be coupled to transmit any suitable information to a control interface for a voltage domain to control a corresponding voltage supplied to at least a portion of integrated circuit 110. Control processing logic 564 for one embodiment may help control supply of a voltage for a corresponding voltage domain by transmitting to a corresponding control interface any suitable control information based at least in part on, for example and without limitation, a VID, a current load, a voltage offset, and/or a loadline. Control processing logic 564 for one embodiment may also be coupled to receive any suitable information from a control interface for a voltage domain to help monitor and control supply of a corresponding voltage. A voltage domain control interface for one embodiment may have one or more registers to store any suitable control and/or status information to help monitor and/or control supply of a corresponding voltage.

For one embodiment where switching VR circuitry 124 has multiple switching VR cells for a voltage domain, control processing logic 564 for one embodiment may control such switching VR cells individually through a corresponding voltage domain control interface. Control processing logic 564 for one embodiment may control such switching VR cells collectively through control of a corresponding voltage domain control interface. Control processing logic 564 for one embodiment may control such switching VR cells in some ways individually and in some ways collectively. As one example, as illustrated in FIG. 5, control processing logic 564 for one embodiment may control VR cells 581, 582, 583, and 584 individually and/or collectively using voltage domain control interface 572 to control voltage 591. For one embodiment, one or more switching VR cells for a voltage domain may be selectively enabled and disabled to help adjust a voltage supplied for that domain.

VR control logic 122 for one embodiment may have any suitable logic to implement separate cell control interfaces for individual control of switching VR cells. VR control logic 122 may have such cell control interfaces in addition to or in lieu one or more voltage domain control interfaces.

Control processing logic 564 for one embodiment may be coupled to control one or more input voltages for switching VR circuitry 124 from one or more power supplies 130 to help control one or more voltages supplied to at least a portion of integrated circuit 110. As illustrated in FIG. 5, control processing logic 564 for one embodiment may be coupled to control one or more voltage regulators of power supply(ies) 130.

Figure 6:
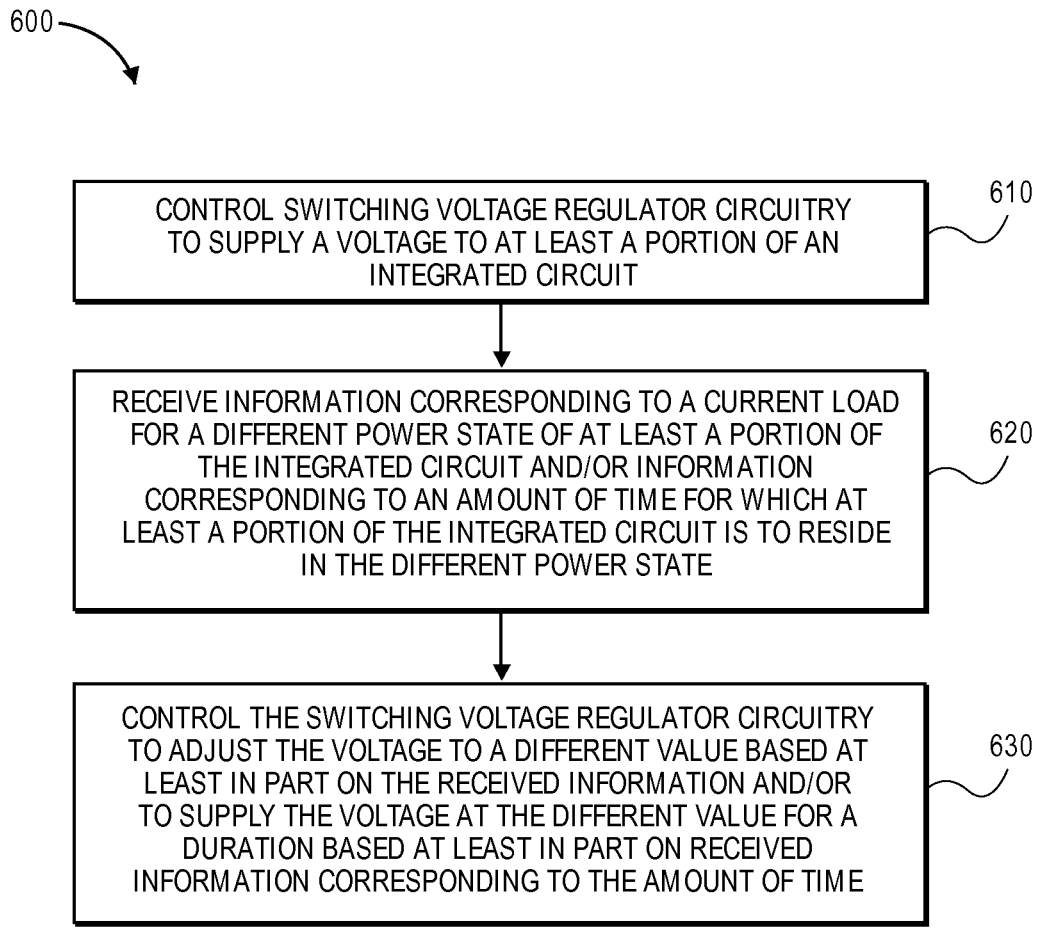
FIG. 6 illustrates, for one embodiment, a flow diagram to control supply voltage for at least a portion of an integrated circuit based at least in part on a power state of the integrated circuit.

FIG. 6 illustrates, for one embodiment, a flow diagram 600 for one embodiment of VR control logic 122. For block 610 of FIG. 6, VR control logic 122 may control switching VR circuitry 124 to supply a voltage to at least a portion of integrated circuit 110. For block 620, VR control logic 122 may receive information corresponding to a current load for a different power state of at least a portion of integrated circuit 110. For block 630, VR control logic 122 may control switching VR circuitry 124 to adjust the voltage to a different value based at least in part on the received information. For one embodiment where at least a portion of integrated circuit 110 is to reside in the different power state for at least an amount of time, VR control logic 122 for one embodiment may receive for block 620 information corresponding to the amount of time and may control for block 630 switching VR circuitry 124 to supply the voltage at the different value for a duration based at least in part on the received information corresponding to the amount of time.

As one example with reference to FIG. 5, VR control logic 122 for one embodiment may receive at interface 562 a command having information identifying a different power state of at least a portion of integrated circuit 110 and having information corresponding to an amount of time in which at least a portion of integrated circuit 110 is to reside in the different power state. Control processing logic 564 for one embodiment may decode the command and perform the command by at least referencing LUT 566 to identify a corresponding current load for the different power state, optionally saving any suitable information corresponding to a resume power state, identifying a duration based at least in part on the received information corresponding to the amount of time, initiating a timer, and adjusting one or more voltages supplied to at least a portion of integrated circuit 110 to a different value based at least in part on the identified current load. Control processing logic 564 may adjust one or more voltages by using a corresponding voltage domain control interface and/or by adjusting one or more input voltages for switching VR circuitry 124 from one or more power supplies 130. In response to expiration of the identified duration, control processing logic 564 may automatically adjust one or more voltages supplied to at least a portion of integrated circuit 110 for a resume power state.

For one embodiment where VR control logic 122 may control multiple voltages supplied to at least a portion of integrated circuit 110, VR control logic 122 for one embodiment may control only one or more but less than all such voltages in response to a received command and/or received information. VR control logic 122 for one embodiment may then support having different power states for different portions of integrated circuit 110 at the same time. VR control logic 122 for one embodiment may identify one or more voltages to be adjusted in any suitable manner. VR control logic 122 for one embodiment may identify one or more voltages to be adjusted, for example, based at least in part on a received command and/or received information identifying a power state applicable to only a portion of integrated circuit 110. VR control logic 122 for one embodiment may be adapted to receive a command having information corresponding to a portion of integrated circuit 110 to identify one or more voltages to be adjusted. VR control logic 122 for one embodiment, as illustrated in FIG. 5, may use control processing logic 564 to identify one or voltage domains for which a corresponding voltage is to be controlled in response to a received command and/or received information.

EXAMPLE SYSTEM

VR control logic 122 may be used for supply voltage control for any suitable one or more integrated circuits in any suitable environment.

Figure 7:
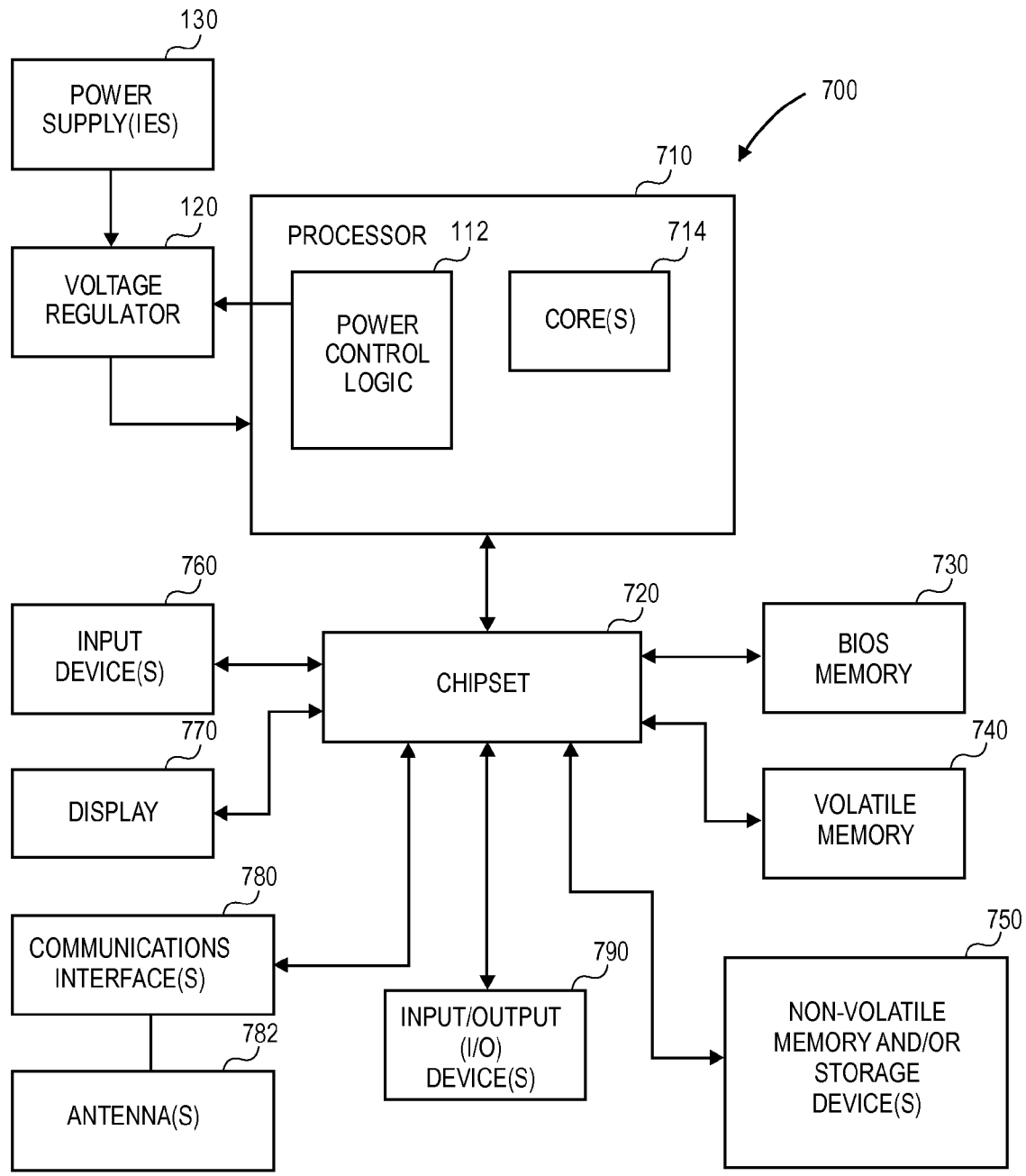
FIG. 7 illustrates, for one embodiment, a block diagram of an example system comprising a processor and a voltage regulator to control supply voltage for at least a portion of the processor based at least in part on a power state of the processor.

FIG. 7 illustrates an example system 700 including power supply(ies) 130 and VR 120 to supply one or more voltages to a processor 710 having one or more integrated circuits. Processor 710 for one embodiment may include power control logic 112 and one or more cores 714 to perform instructions. For one embodiment, one or more of core(s) 714 may be integrated with power control logic 112. For one embodiment, at least a portion of VR 120 may be integrated on a single die and packaged with processor 710.

System 700 for one embodiment may also include a chipset 720 coupled to processor 710, a basic input/output system (BIOS) memory 730 coupled to chipset 720, volatile memory 740 coupled to chipset 720, non-volatile memory and/or storage device(s) 750 coupled to chipset 720, one or more input devices 760 coupled to chipset 720, a display 770 coupled to chipset 720, one or more communications interfaces 780 coupled to chipset 720, and/or one or more other input/output (I/O) devices 790 coupled to chipset 720.

Chipset 720 for one embodiment may include any suitable interface controllers to provide for any suitable communications link to processor 710 and/or to any suitable device or component in communication with chipset 720.

Chipset 720 for one embodiment may include a firmware controller to provide an interface to BIOS memory 730. BIOS memory 730 may be used to store any suitable system and/or video BIOS software for system 700. BIOS memory 730 may include any suitable non-volatile memory, such as a suitable flash memory for example. BIOS memory 730 for one embodiment may alternatively be included in chipset 720.

Chipset 720 for one embodiment may include one or more memory controllers to provide an interface to volatile memory 740. Volatile memory 740 may be used to load and store data and/or instructions, for example, for system 700. Volatile memory 740 may include any suitable volatile memory, such as suitable dynamic random access memory (DRAM) for example.

Chipset 720 for one embodiment may include a graphics controller to provide an interface to display 770. Display 770 may include any suitable display, such as a cathode ray tube (CRT) or a liquid crystal display (LCD) for example. The graphics controller for one embodiment may alternatively be external to chipset 720.

Chipset 720 for one embodiment may include one or more input/output (I/O) controllers to provide an interface to non-volatile memory and/or storage device(s) 750, input device(s) 760, communications interface(s) 780, and/or I/O devices 790.

Non-volatile memory and/or storage device(s) 750 may be used to store data and/or instructions, for example. Non-volatile memory and/or storage device(s) 750 may include any suitable non-volatile memory, such as flash memory for example, and/or may include any suitable non-volatile storage device(s), such as one or more hard disk drives (HDDs), one or more compact disc (CD) drives, and/or one or more digital versatile disc (DVD) drives for example.

Input device(s) 760 may include any suitable input device(s), such as a keyboard, a mouse, and/or any other suitable cursor control device.

Communications interface(s) 780 may provide an interface for system 700 to communicate over one or more networks and/or with any other suitable device. Communications interface(s) 780 may include any suitable hardware and/or firmware. Communications interface(s) 780 for one embodiment may include, for example, a network adapter, a wireless network adapter, a telephone modem, and/or a wireless modem. For wireless communications, communications interface(s) 780 for one embodiment may use one or more antennas 782.

I/O device(s) 790 may include any suitable I/O device(s) such as, for example, an audio device to help convert sound into corresponding digital signals and/or to help convert digital signals into corresponding sound, a camera, a camcorder, a printer, and/or a scanner.

Although described as residing in chipset 720, one or more controllers of chipset 720 may reside with processor 710, allowing processor 710 to communicate with one or more devices or components directly. One or more controllers of chipset 720 for one embodiment may be integrated on a single die with at least a portion of processor 710. One or more controllers of chipset 720 for one embodiment may be packaged with processor 710. As one example, one or more memory controllers for one embodiment may reside with processor 710, allowing processor 710 to communicate with volatile memory 740 directly.

In the foregoing description, example embodiments have been described. Various modifications and changes may be made to such embodiments without departing from the scope of the appended claims. The description and drawings are, accordingly, to be regarded in an illustrative rather than a restrictive sense.

What is claimed is:

1. An apparatus comprising:
   first logic to perform one or more functions; and
   second logic integrated with the first logic in an integrated circuit,
   the second logic to send to voltage regulator control logic first information corresponding to a current load for a different power state of at least a portion of the integrated circuit to adjust a voltage supplied to at least a portion of the integrated circuit to a different value.

2. The apparatus of claim 1, wherein at least a portion of the integrated circuit is to reside in the different power state for at least an amount of time, and
   wherein the second logic is to send to the voltage regulator control logic second information corresponding to the amount of time to have the voltage supplied at the different value for a duration based at least in part on received information corresponding to the amount of time.

3. The apparatus of claim 1, wherein the first logic includes one or more cores to perform instructions.

4. A method comprising:
   receiving a voltage for a power state of at least a portion of an integrated circuit having first logic to perform one or more functions and second logic integrated with the first logic; and
   sending from the second logic to voltage regulator control logic, first information corresponding to a current load for a different power state of at least a portion of the integrated circuit to adjust the voltage to a different value.

5. The method of claim 4, wherein at least a portion of the integrated circuit is to reside in the different power state for at least an amount of time, and
   wherein the method comprises:
   sending from the second logic to the voltage regulator control logic, second information corresponding to the amount of time to receive the voltage at the different value for a duration based at least in part on the sent second information corresponding to the amount of time.

6. The method of claim 4, comprising performing one or more instructions using one or more cores of the first logic.

7. The apparatus of claim 1, wherein the first information corresponds to voltage identification (VID).

8. The apparatus of claim 1, wherein the second logic to send, to the voltage regulator control logic, third information corresponding to a current load for a different power state of at least a portion of the integrated circuit to adjust a voltage supplied to at least a portion of the integrated circuit to a different value, wherein the first information is different from the third information.

9. The apparatus of claim 8, wherein the first and third information are provided as a single command or separate commands.

10. The apparatus of claim 1, wherein the different power states include at least one of:
    normal mode,
    idle mode,
    deep-idle mode,
    standby mode,
    sleep mode,
    deep-sleep mode, or
    non-powered mode.

11. The apparatus of claim 1, wherein the second logic to identify whether a portion or all of the integrated circuit is about to enter, is entering, or has entered a different power state.

12. The apparatus of claim 1, wherein the second logic to statistically predict a pattern of workload of the first logic to identify an amount of time the first logic to remain in a particular power state.

* * * * *